United States Patent

[11] 3,570,360

[72] Inventor Harold J. Siegel
 415 Lowell Avenue, Newtonville, Mass. 2160
[21] Appl. No. 817,924
[22] Filed Apr. 21, 1969
[45] Patented Mar. 16, 1971

[54] MUSIC TEACHING DEVICE
 11 Claims, 7 Drawing Figs.
[52] U.S. Cl. .................................................. 84/477, 84/478
[51] Int. Cl. ...................................................... G09b 15/02
[50] Field of Search ............................................ 84/470, 471, 473, 477—483

[56] References Cited
UNITED STATES PATENTS
1,400,947 12/1921 Fennell ........................ 84/478
3,256,765 6/1966 Siegel ......................... 84/478

Primary Examiner—Richard B. Wilkinson
Assistant Examiner—John F. Gonzales
Attorney—Rich & Ericson ABSTRACT: A music teaching device has a simulated keyboard, and a slide for supporting masks or cards printed with musical staffs and notations. The masks are of various lengths corresponding to different musical scales, and serve to position the slide to engage a set of selector contacts with any of various columns of note contacts. Each column is connected with appropriate ones of a set of contacts associated with the keyboard, to form a circuit operable by manual contactors only when the student properly matches a musical notation with the key corresponding to it in the selected scale.

Patented March 16, 1971

Inventor:
Harold J. Siegel,
by Thomson, Mrose & Ericson
Attorneys

Patented March 16, 1971
3,570,360
3 Sheets-Sheet 2
Fig. 2.
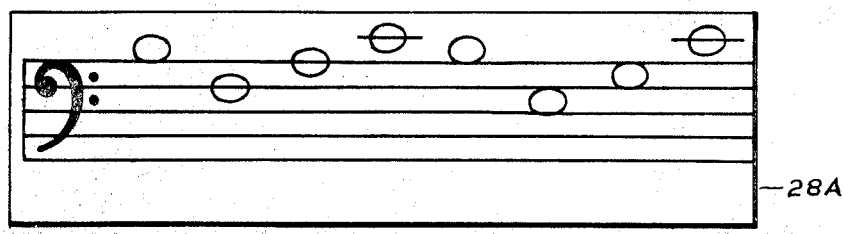
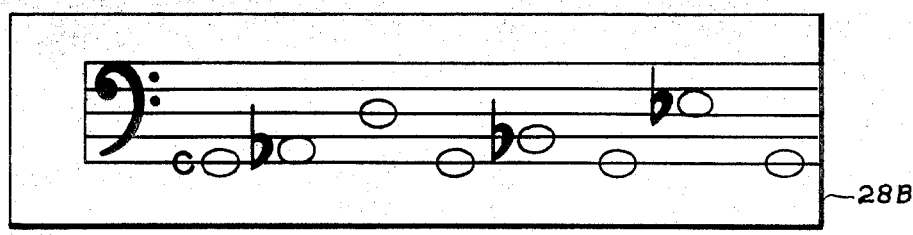
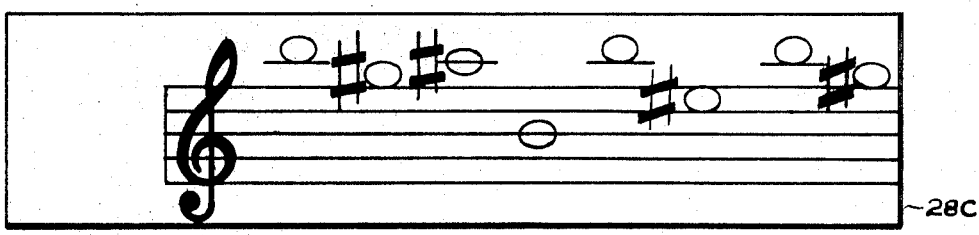
Fig. 3.     Fig. 4.
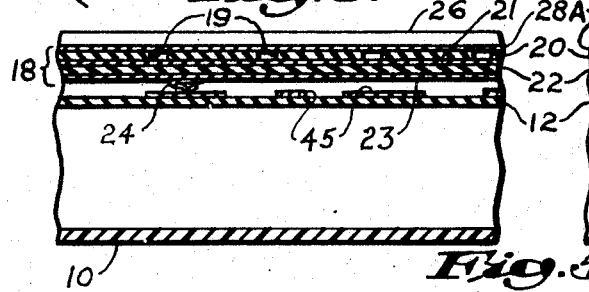
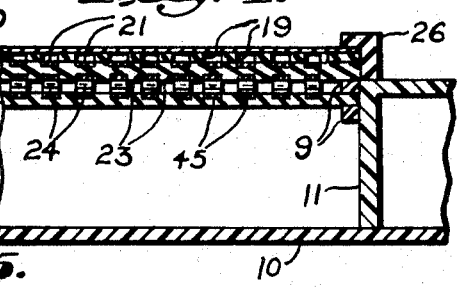
Fig. 5.
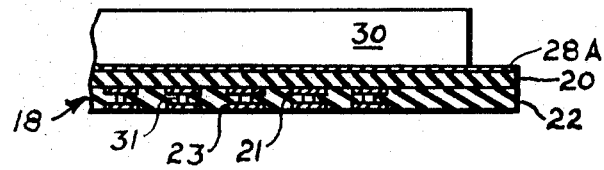
Inventor:
Harold J. Siegel,
by Thomson, Mrose & Ericson
Attorneys Patented March 16, 1971 3,570,360

Inventor:
Harold J. Siegel,
By Thomson, Mrose & Ericson
Attorneys

MUSIC TEACHING DEVICE

BACKGROUND AND BRIEF DESCRIPTION OF THE INVENTION

My U.S. Pat. No. 3,256,765, issued Jun. 21, 1966, describes and claims a music teaching device which has tracks for slidably receiving masks or cards. These include a card bearing a clef symbol, a key signature card having sharp and flat signatures to denote various musical scales or keys, and a note card which has a column of holes representing the positions of notes on the staff. The cards are slidable to positions corresponding to various musical scales or keys, which are indicated by index marks on the tracks. The insertion of a manual contactor into any of the holes in the note card, and through underlying holes in the housing, completes a circuit which energizes a lamp visible through a hole in a corresponding key of a simulated keyboard. The particular position of the note card determines which of a number of columns of note contacts can be energized by the contactor, and these are connected to the keyboard lamps in such a manner that only those keys can be illuminated which correspond to the musical scale that has been selected. The student learns to associate the notes and keys in a complex series of scales with increased facility, because a failure to light the expected key immediately indicates that he is attempting to play a note that does not exist in that particular scale. An audible signal device and a series of oscillator circuits may be added to produce tones corresponding to each key of the keyboard. Another alternative is to provide two manual contactors which must be applied simultaneously to contacts associated with corresponding notes and keys in the chosen scale to produce a signal of light or sound. In that case, a failure to match a musical note with the correct key in the selected scale results in failure to produce a signal.

This device is subject to the objection that the student must position the note card in careful alignment with the proper index mark on the housing in order to render the device operable; otherwise, the contactor holes in the note card will not line up with the underlying holes in the housing. The need for selecting three cards from separate sets of clef, key, and note cards, and for inserting these in correct relative positions in the tracks, in order to change the musical selection, also adds a degree of complexity to the use of the device. Also, musical notes are not presented in the conventional timed succession along the staff, but are represented solely by a single vertical column of holes falling on the lines and spaces of the staff.

It is among the objects of the present invention to provide an improved music teaching device which affords a simplified mode of operation, which requires only one mask or card to be used at one time, and which aligns the mask automatically in operative relation to the other parts when a selected mask is inserted in the device. It is another object to provide a device which utilizes masks having conventional musical notation showing the timed succession of notes along a staff. Further objects and advantages of the invention will appear as the following detailed description proceeds.

DESCRIPTION OF THE DRAWINGS

While the specification concludes with claims particularly pointing out the subject matter which I regard as my invention, it is believed that a clearer understanding may be gained from the following detailed description of preferred embodiments, referring to the accompanying drawings, in which:

FIG. 2 is a view showing several masks or note cards selectively usable with the device, representing different musical scales;

FIG. 3 is a fragmentary sectional view taken along line 3—3 in FIG. 1, looking in the direction of the arrows;

FIG. 4 is a fragmentary sectional view taken along line 4—4 in FIG. 1, looking in the direction of the arrows;

FIG. 5 is a fragmentary sectional view taken along line 5—5 in FIG. 1, looking in the direction of the arrows;

Figure 1:
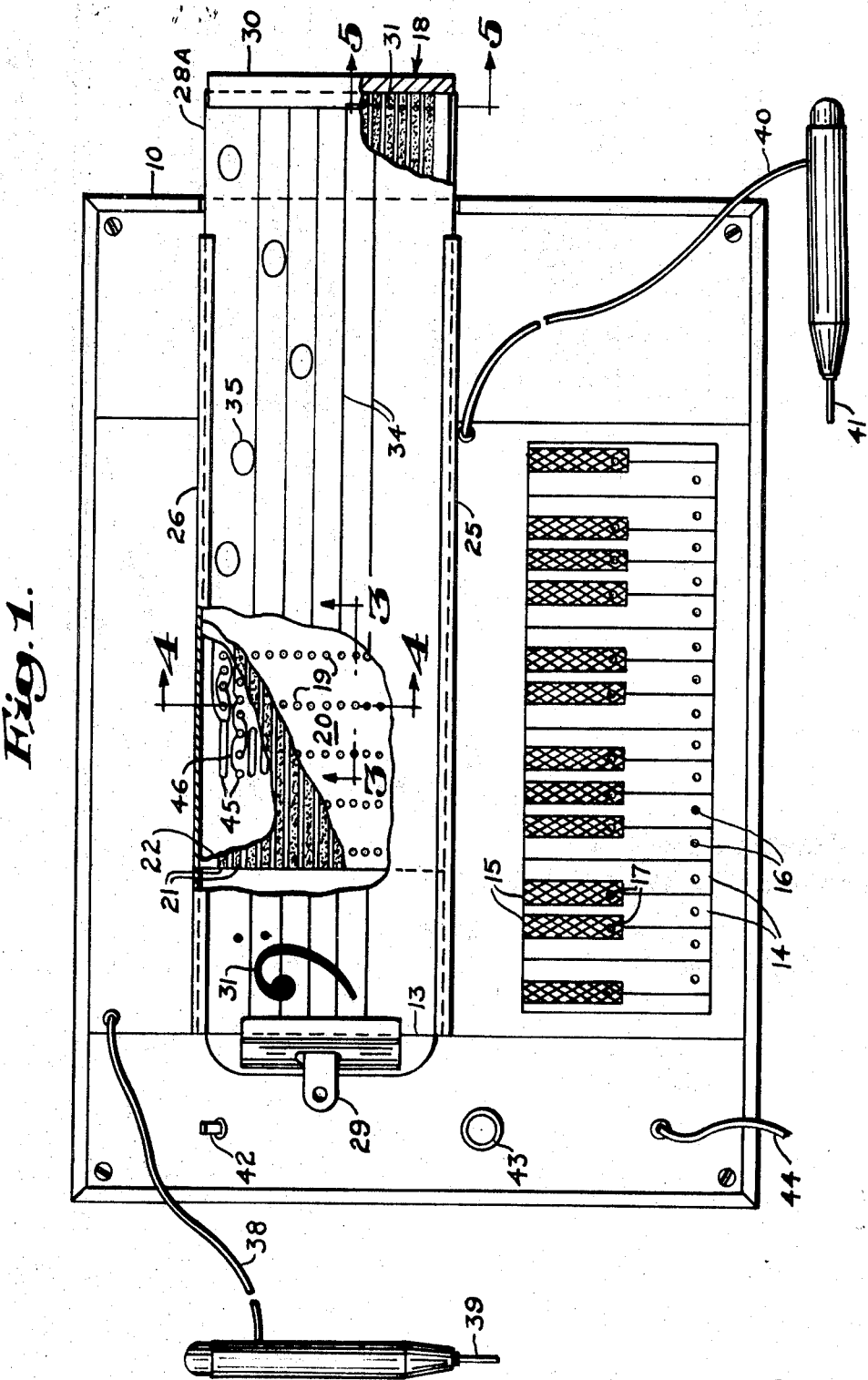
FIG. 1 is a fragmentary plan view of a first form of the improved teaching device.

In the preferred construction, the device is mounted in a housing 10, made of a suitable material such as wood or plastic. A recess 11 (FIG. 4) receives a circuit-mounting panel 12 of insulating material such as plastic; the panel is secured by strips 9 extending around its periphery. Extending in parallel relation on top of the housing and along the edges of the recess 11 are a pair of tracks 25 and 26, which slidably receive a slide 18 for movement to the left or right in FIG. 1. A stop abutment 13 is formed on the housing at the left end of the tracks 25 and 26, perpendicular to these tracks. This abutment serves to position the left end of any selected one of a series of note cards or masks 28A, 28B, 28C, etc., of various lengths, which are slidable into the tracks on top of the slide 18.

The note cards or masks 28 are preferably made of paper so that they can be perforated easily by a manual electrical contactor 39. If made of tougher material such as plastic, each note 35 should have a hole to receive the contactor. The masks bear representations of musical staffs 34, clef signatures 31, and a selected series of notes 35; sharp and flat signatures may also be used if desired, in accordance with conventional notation.

A spring clip 29 of a conventional type is provided to hold the selected mask securely in place. The slide 18 has a stop abutment 30 at its right end, extending perpendicular to the tracks 25 and 26 to locate the slide in a specific position relative to the housing and the circuit panel 12. The position of the slide is thus accurately determined by the length of the selected mask.

The slide 18 is formed of two sheets 20 and 22 of plastic or other insulating material, fastened by rivets 31. The lower face of the sheet 22 mounts a series of dependent selector contacts 24, arranged in a column which preferably extends perpendicularly to the tracks 25 and 26. The selector contacts are effectively extended to the upper face of the sheet 22 by means of a series of conductive strips 21 wrapped about the sheet, and arranged in parallel relation with a spacing such that one strip underlies each line and space of the staff 34 on the overlying mask 28A, etc.

The upper sheet 20 is formed with a number of columns of holes 19, each column having a hole aligned with each strip 21 and with a corresponding line or space of the staff 34. The spacing between the columns of the holes 19 is equal to the spacing between successive notes 35. By placing the contactor 39 on any note with slight pressure, the student may cause it to contact the underlying strip 21.

A number of rows of note contacts 45 are mounted on the panel 12 and interconnected by circuits of wire 46. These contacts and circuits may be formed by printed-circuit techniques, or separately attached and wired to the panel. Each column extending perpendicular to the tracks 25 and 26 represents a different musical scale or key; the column of selector contacts 24 may be brought into engagement with any selected column of note contacts by moving the slide 18 to a corresponding position. Thus, the specific length of any of the masks 28A, etc., is such that the slide 18 will be positioned by that mask so that the contacts 24 engage a column of note contacts 45 corresponding to the scale in which the music noted on that mask is written.

The housing 10 is also provided with a simulated keyboard comprising painted or printed keys 14 corresponding to several octaves of the white or natural keys of a piano, and keys 15 corresponding to the black or sharp and flat keys. Each of the white keys has a hole 16, and each of the black a hole 17. Underlying these holes are a series of contacts 48

(FIG. 6), any one of which may be engaged by a second manual contactor 41 passed into the hole in the corresponding key.

The housing also mounts a switch 42 used for selecting bass or treble frequency ranges of oscillator circuits forming a part of signalling means to be described hereinafter, and a volume control knob 43. Electrical power is supplied from an external source by a cable 44. The contactors 39 and 41 are connected to the circuitry of the device by cables 38 and 40, respectively, extending far enough from the housing so that the user can conveniently apply the respective contactors to the masks 28A, etc., and to the keyboard.

Figures 6, 7:
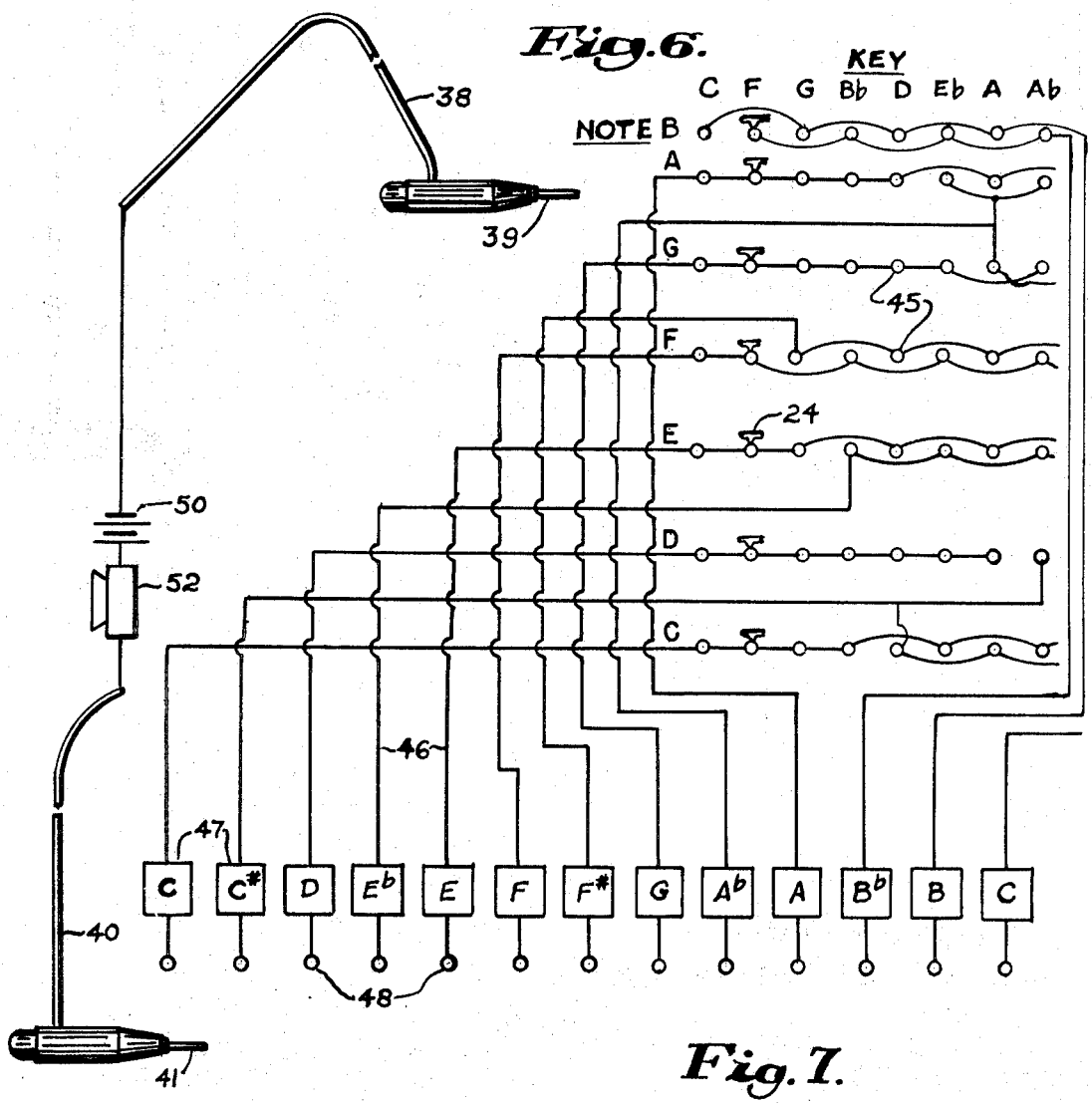
FIG. 6 is a schematic view of a portion of an operating circuit and signalling means, using two manual contactors to produce audible tones.
FIG. 7 is a schematic view of a portion of an alternative operating circuit, using one manual contactor to produce both audible and visual signals.

Referring now to FIG. 6, an energizing circuit and signalling means are shown. There are 15 note contacts 45 in each of 13 vertical columns in the preferred embodiment, and 28 key contacts 48 underlying the keyboard; but only seven note contacts 45 in each column, eight such columns, and 13 key contacts 48 are shown in FIG. 6, as this will illustrate the wiring plan adequately. The same scheme is repeated for successive octaves.

Power is obtained from a suitable source 50, supplied by the cable 44 of FIG. 1. The contactors 39 and 41 are connected in series with the power source and with a loudspeaker, headphones, or other sound transducer 52 for reproducing audible tones.

The horizontal rows of note contacts 45 are identified by the letters of the notes to which they correspond, C through B; while the vertical columns are identified by the various musical scales or keys which each represents, C,F,G, etc.

A number of audiofrequency oscillator circuits 47 of any conventional construction are wired each to one of the contacts 48. Each oscillator circuit is tuned to the frequency of the note corresponding to the key associated with its contact, and is lettered accordingly.

The wiring 46 connects each note contact 45 with that one of the oscillators 47 which is tuned to the audiofrequency that the note of that contact represents in any selected musical scale of key C,F,G, etc. whether natural, sharp, or flat. The oscillators in turn connect each note contact 45 with the contact 48 that corresponds to its particular note in any selected scale, whether natural, sharp, or flat. The selection of the specific scale is made by positioning the slide 18, by means of one of the masks 28A, etc., to engage the column of selector contacts 24 with a specific vertical column of note contacts 45. The contacts 24 are shown engaging the second vertical column of contacts 45 in FIG. 6, for example, so that the instrument is connected to play only in the scale of F, in which the note of B is played flat. The note contact 45 in the B horizontal row and the F vertical column is consequently connected to the B flat oscillator 47, while all other note contacts in the F key column are connected to the natural frequency oscillators of their various notes.

In use, the student selects any mask 28A, etc., and places it in the slide 18, pushing the slide to the left in FIG. 1 until the ends of the mask engage the stops 13 and 30. He then pushes the contactor 39 against the first note 35 shown on the mask, and inserts the contactor 41 into the hole in the key 14 or 15 which he thinks should be played for that note in that musical scale or key. If he does this correctly, a circuit will be completed from the power source 50 through the contactor 39, the note contact 45 underlying the note shown on the mask, the oscillator 47 of corresponding frequency, the associated contact 48, the contactor 41, and the loudspeaker 52, which will sound the proper tone, back to the power source. But if the user touches the contactor 41 to the wrong key of the keyboard, no sound will be produced.

It should be noted at this point that the notes 35 may be printed anywhere along the staff 34 on the mask, provided only that it coincides with one of the series of holes 19 in the upper layer of the slide 18. For more complex music with briefer time intervals, the holes 19 could be more closely spaced, or even extended to form longitudinal slots. The use of the strip contacts 21 therefore makes it possible to present musical notes on the masks in conventional notation, and in timed succession.

A modified arrangement of the circuitry is shown in FIG. 7 which is adapted for more elementary instruction. The contactor 41 for the keyboard is omitted, so that the student operates only the mask contactor 39. The speaker 52 is wired in common to all of the oscillators 47 by the cable 40, so that the student can produce the audible tone corresponding to each note shown on a mask or note card merely by touching the contactor 39 to that note. A number of lamps 54 are connected each in series with one of the oscillators, and each located under one of the holes in the keys 14 and 15, to give a visual signal of the key which corresponds to the note in the selected musical scale.

I claim:

1. A music teaching device comprising a plurality of mask means each bearing a representation of a musical staff and each having a discrete length corresponding to a particular musical scale, housing means provided with means simulating the keys of a musical instrument, signalling means, circuit means for operating said signalling means to indicate correspondence between a key and a note on said staff, slide means movable on said housing means and constructed and arranged for supporting any selected one of said mask means in a position of said slide means determined by the discrete length of the selected mask means, said circuit means including cooperating contact means on said slide means and said housing means for rendering said circuit means operable only for corresponding keys and notes in a particular musical scale determined by the selected mask means.

2. A music teaching device as recited in claim 1, said slide means having means for positioning one end of a selected mask means at a predetermined location thereon, said housing means having means for positioning a second end of a selected mask at a predetermined location thereon to locate said slide.

3. A music teaching device as recited in claim 1, said circuit means including a plurality of columns of note contacts mounted on said housing means, each column corresponding to the notes of a different musical scale, said circuit means including a set of selector contacts mounted on said slide and arranged in a column, said slide being movable transversely of said columns of note contacts to engage said selector contacts with a column of said note contacts corresponding to the length of a selected mask means supported on said slide means.

4. A music teaching device as recited in claim 3, said slide overlying said columns of note contacts, said selector contacts projecting from a lower face of said slide for engagement with said note contacts, said selector contacts extending into elongated parallel contact strips, said staff representations on said mask means having lines and spaces each overlying a corresponding one of said contact strips.

5. A music teaching device as recited in claim 4, said slide having a first insulating lamination, said selector contacts projecting from a lower face and said contact strips overlying an upper face of said first lamination, and a second insulating lamination overlying said contact strips and formed with a plurality of openings communicating therewith, said mask means being receivable in overlying relation to said second lamination.

6. A music teaching device as recited in claim 3, said circuit means including a manually-operable contactor engageable with any selected one of said contact means on said slide means to render said circuit means operable for a corresponding note.

7. A music teaching device as recited in claim 3, said circuit means including a set of key contacts one associated with each of said keys, said circuit means connecting successive columns of said note contacts each with a selected group of said key contacts whose associated keys correspond to the notes of a selected musical scale.

8. A music teaching device as recited in claim 7, said circuit means including manually-operable contactor means simultaneously engageable with any one of said key contacts and any one of said selector contacts, to operate said signalling means only when the key and note selected by said contactor means correspond in the musical scale determined by the length of a selected mask means supported on said slide means.

9. A music teaching device as recited in claim 1, said signalling means comprising audiofrequency oscillating circuits and a sound transducer connected to produce an audible signal of a frequency equivalent to any selected corresponding key and note.

10. A music teaching device as recited in claim 1, said signalling means comprising a series of lamps one associated with each of said keys.

11. A music teaching device comprising housing means provided with means simulating the keys of a musical instrument, a number of key contacts each associated with one of said keys, a number of columns of note contacts each column corresponding to the notes of a selected musical scale, first circuit means connecting successive columns of said note contacts each with a selected group of said key contacts whose associated keys correspond to the notes of the selected musical scale, a slide bearing a set of selector contacts arranged in a column, said slide being movable transversely of said columns of note contacts to engage said selector contacts with a different column of said note contacts in each of a number of positions of the slide, a plurality of masks each bearing a representation of a musical staff and each of length corresponding to a selected musical scale, said slide being adapted to support any selected mask thereon and said masks having staff lines and spaces each overlying a corresponding one of said selector contacts, said slide having means for positioning one end of the selected mask at a predetermined location thereon, said housing having means for positioning a second end of the selected mask at a predetermined location thereon to locate said slide in one of said positions in which said selector contacts engage one of said columns of note contacts corresponding to the musical scale of the selected mask, a first manually-operable contactor engageable with any selected one of said key contacts, a second manually-operable contactor engageable through any selected line or space of the staff of said mask with a corresponding one of said selector contacts, second circuit means interconnecting said contactors, energizing and signalling means, said contactors completing a circuit through said first and second circuit means and said energizing and signalling means when engaged with key and selector contacts corresponding to one another in the selected musical scale.